US012571492B2

(12) United States Patent
Vioglio et al.

(10) Patent No.: US 12,571,492 B2
(45) Date of Patent: Mar. 10, 2026

(54) FITTING ASSEMBLY FOR VEHICULAR TUBES AND HYDRAULIC ASSEMBLY COMPRISING SUCH FITTING ASSEMBLY

(71) Applicant: ERRECINQUE S.R.L., Mappano (IT)

(72) Inventors: Enrico Vioglio, Mappano (IT); Matteo Bolzoni, Mappano (IT)

(73) Assignee: ERRECINQUE S.R.L., Mappano (IT)

( * ) Notice: Subject to any disclaimer, the term of this patent is extended or adjusted under 35 U.S.C. 154(b) by 5 days.

(21) Appl. No.: 18/556,467

(22) PCT Filed: May 11, 2022

(86) PCT No.: PCT/IB2022/054370
§ 371 (c)(1),
(2) Date: Oct. 20, 2023

(87) PCT Pub. No.: WO2022/238916
PCT Pub. Date: Nov. 17, 2022

(65) Prior Publication Data
US 2024/0183474 A1     Jun. 6, 2024

(30) Foreign Application Priority Data
May 12, 2021     (IT) ......................... 102021000012176

(51) Int. Cl.
*F16L 33/207*          (2006.01)
(52) U.S. Cl.
CPC ............................... *F16L 33/2073* (2013.01)
(58) Field of Classification Search
CPC ............................ F16L 33/2073; F16L 37/144
See application file for complete search history.

(56) References Cited

U.S. PATENT DOCUMENTS

| | | | | |
|---|---|---|---|---|
| 5,542,716 A | * | 8/1996 | Szabo | ................... F16L 37/144 |
| | | | | 285/305 |
| 2005/0253388 A1 | * | 11/2005 | Smith | ................. F16L 33/2073 |
| | | | | 285/382.4 |

(Continued)

FOREIGN PATENT DOCUMENTS

| | | |
|---|---|---|
| DE | 102015209722 A1 | 12/2016 |
| EP | 1412668 B1 | 11/2005 |

(Continued)

OTHER PUBLICATIONS

International Search Report and Written Opinion for International Application No. PCT/IB2022/054370 mailed Jul. 19, 2022.

*Primary Examiner* — James M Hewitt, II
(74) *Attorney, Agent, or Firm* — Ballard Spahr LLP

(57) ABSTRACT

A fitting assembly for fitting a first tube element to a second tube element comprising a fitting element defining a longitudinal axis and comprising a male portion adapted to engage the first tube element and a female portion adapted to be engaged by the second tube element; the female portion being opposite to the male portion along the longitudinal axis and further defining a seat; a bushing element adapted to be arranged radially external with respect to the male portion and the first tube element and to exert a radial compression on the first tube element; and a locking element adapted to limit the relative movements of the second tube element with respect to the fitting element when it engages the seat.

10 Claims, 4 Drawing Sheets

(56)        References Cited

U.S. PATENT DOCUMENTS

| | | | |
|---|---|---|---|
| 2006/0284414 A1 | 12/2006 | Green et al. | |
| 2010/0194100 A1* | 8/2010 | Koch | F16L 33/2076 |
| | | | 285/256 |
| 2012/0086201 A1 | 4/2012 | Murken | |
| 2013/0307263 A1* | 11/2013 | Parks | F16L 37/144 |
| | | | 285/319 |
| 2014/0319820 A1* | 10/2014 | Takimoto | F16L 37/0885 |
| | | | 285/148.21 |
| 2014/0326223 A1* | 11/2014 | Proettel | F02M 35/10209 |
| | | | 123/559.1 |
| 2017/0059072 A1* | 3/2017 | Parks | F16L 37/144 |
| 2017/0067588 A1* | 3/2017 | Chaupin | F16L 37/144 |
| 2021/0301960 A1* | 9/2021 | Barthel | F16L 37/0985 |

FOREIGN PATENT DOCUMENTS

| | | | |
|---|---|---|---|
| EP | 1898139 | A2 | 3/2008 |
| WO | 2006074719 | A1 | 7/2006 |

* cited by examiner

FITTING ASSEMBLY FOR VEHICULAR TUBES AND HYDRAULIC ASSEMBLY COMPRISING SUCH FITTING ASSEMBLY

CROSS-REFERENCE TO RELATED APPLICATIONS

This patent application is a U.S. National Stage of PCT International Application No. PCT/IB2022/054370 filed on May 11, 2022, which claims priority to Italian Patent Application No. 102021000012176 filed on May 12, 2021, the entire disclosure of each of the foregoing applications is incorporated herein by reference.

TECHNICAL FIELD OF THE INVENTION

The present invention relates to a fitting assembly for tube elements, in particular for vehicular tubes.

The present invention also relates to a hydraulic assembly, in particular for vehicular tubes.

STATE OF THE ART

Solutions for fitting tube elements for vehicular purposes are known. These solutions provide for mechanically connecting tube elements together in order to achieve, at the same time, the fluid-dynamic connection thereof.

The known solutions generally provide for the use of a fitting element equipped with two or more openings, which are engaged with respective tube elements, for example, by means of a threaded connection.

However, in cases where the fluid travelling in the tubes reaches high pressures (e.g., higher than 5 bar), the known solutions were not found to allow the leakage of the fluid between the gaps occurring between the joined parts to be prevented effectively.

This problem is particularly felt in applications involving the transfer of pressurized fluids, for example, in the field of hydrogen supply for vehicles.

Therefore, there is a need to provide a fitting assembly for tube elements, which guarantees the transfer of pressurized fluids in a simple and fast way, while minimizing leaks thereof.

The object of the present invention is to meet the above requirements in a cost-effective and optimized manner.

SUBJECT AND SUMMARY OF THE INVENTION

Said object is achieved by means of a fitting assembly and a hydraulic assembly as claimed in the appended claims.

BRIEF DESCRIPTION OF THE DRAWINGS

For a better understanding of the present invention, a preferred embodiment is described below by way of non-limiting example and with reference to the accompanying drawings, wherein.

DETAILED DESCRIPTION OF PREFERRED EMBODIMENTS OF THE INVENTION

Figure 1:
FIG. 1 shows a perspective view of a fitting assembly according to the present invention used to connect two tube elements.

FIG. 1 shows a fitting assembly 10 for fitting a first tube element 1 to a second tube element 2 for vehicular purposes. At the same time, this fitting assembly 10 provides the mechanical and fluid-dynamic connection of the first and second tube elements 1, 2 and therefore allows the transfer of a pressurized fluid between said first and second tube elements 1, 2.

The pressurized fluid may be, by way of example, hydrogen flowing in a vehicular tube. Moreover, the transfer of said fluid can occur in the direction that goes from the first tube element 1 to the second tube element 2, or vice versa.

In the non-limiting embodiment shown, the fluid is at a pressure of at least 5 bar.

The first and second tube elements 1, 2 can be made of metallic, polymeric, or composite material. In particular, they can be made of the same material, or of different materials.

In the embodiment shown, the first tube element 1 is a flexible tube made of polymeric or composite (non-metallic) material and the second tube element 2 is made of metallic, polymeric, or composite material. As shown in FIG. 1, the fitting assembly 10 comprises a fitting element 3, which defines a longitudinal axis A and comprises a male portion 4 and a female portion 5 opposite each other along said longitudinal axis A. The male portion 4 is adapted to engage the first tube element 1, whereas the female portion 5 is adapted to be engaged by the second tube element 2. The female portion 5 also defines a seat 6.

The fitting assembly 10 further comprises a bushing element 7, which is fitted around the first tube element 1 in a radially external position with respect to the male portion 4. This bushing element 7 exerts a radial compression on the first tube element 1 with respect to the longitudinal axis A.

The fitting assembly 10 also comprises a locking element 8, which is shaped to engage the seat 6 so as to prevent and/or limit the relative movements between the second tube element 2 and the fitting element 3.

In particular, the assembly of the first tube element 1, the second tube element 2 and the fitting assembly 10 for fitting the first tube element 1 to the second tube element 2 defines a hydraulic assembly.

Figures 4, 5:
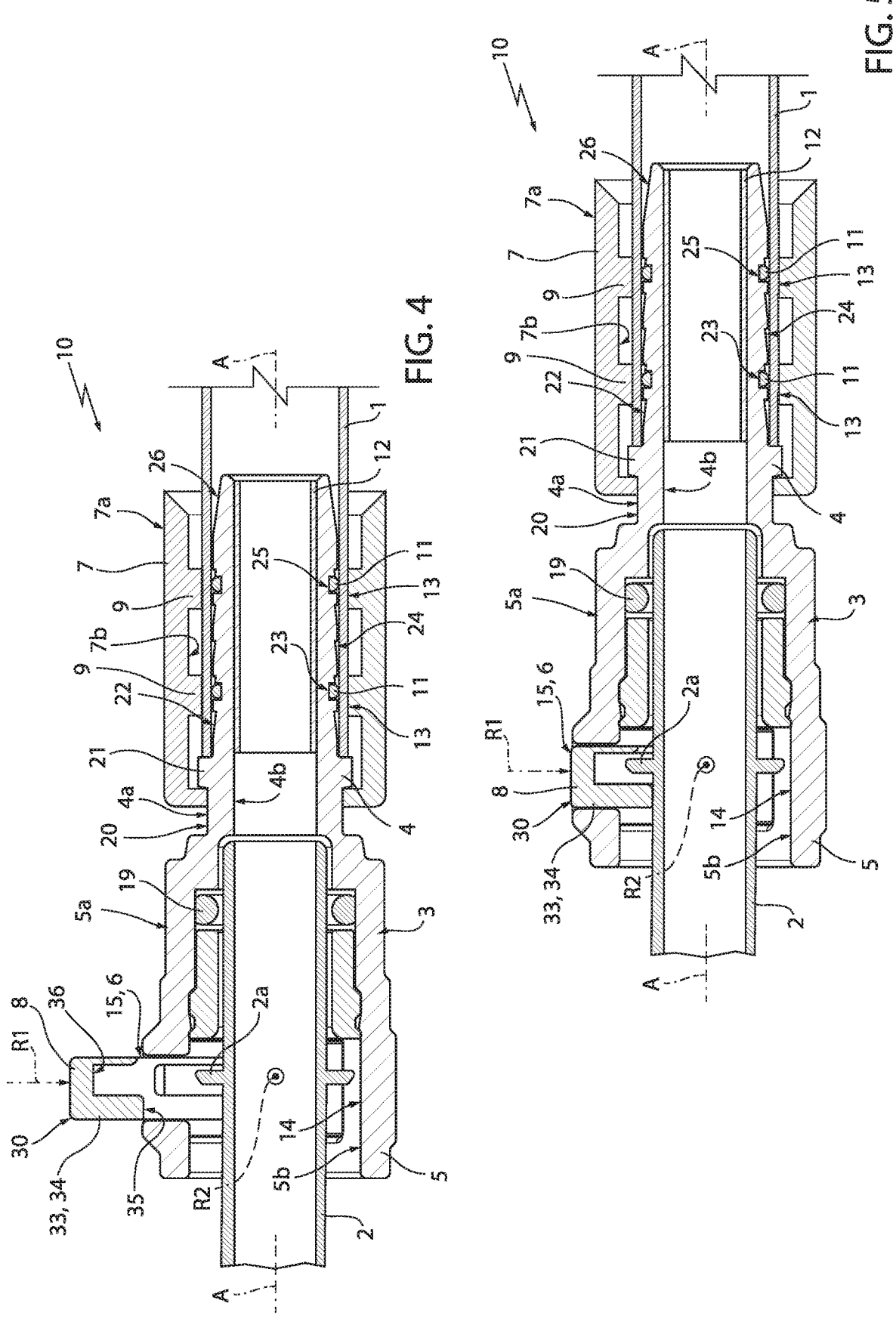
FIGS. 4 and 5 are cross-sectional views of the fitting assembly in FIG. 2 with the two tube elements in respective operating positions.

As shown in FIGS. 1, 4 and 5, the first and second tube elements 1, 2 are arranged coaxially with each other and with the longitudinal axis A of the fitting element 3.

Alternatively, the second tube element 2 could be not arranged coaxially with the longitudinal axis A. In particular, the second tube element 2 could be arranged at a certain angle.

By way of example, the second tube element 2 could form an angle of 45° or 90° with respect to the longitudinal axis A.

The bushing element 7 is a crimp bushing having a radially external surface 7a and a radially inner surface 7b.

In the illustrated embodiment, the radially external surface 7a and the radially inner surface 7b are both cylindrical and are arranged coaxially with the longitudinal axis A. In detail, the radially external surface 7a is adapted to be engaged by a crimp tool during a crimping operation, whereas the radially inner surface 7b is adapted to face the first tube element 1.

"Crimping operation" is to be understood as a mechanical compression operation of the bushing element 7, which fastens the first tube element 1 to the male portion 4. In particular, the radially external surface 7a could be no longer cylindrical as a result of the crimping operation.

At the radially inner surface 7b, the bushing element 7 comprises one or more tooth elements 9.

Each tooth element 9 extends throughout the circumferential length of the bushing element 7 and protrudes towards the inside of the bushing element 7 with respect to the radially inner surface 7b. Alternatively, each tooth element 9 extends along part of the circumferential length of the bushing element 7.

Each tooth element 9 also has a length parallel to the axis A. The tooth elements 9 can have the same length, or different lengths parallel to the axis A.

In the embodiment shown, the bushing element 7 comprises two tooth elements 9 spaced apart along the axis A.

The tooth elements 9 are placed in radial contact with the first tube element 1 and exert a radial compression thereon following the crimping operation.

In particular, each tooth element 9 comprises a radially innermost surface 13 on the side opposite the radially inner surface 7b. In the embodiment shown, each tooth element 9 is placed in radial contact with the first tube element 1 at the respective surface 13. Preferably, each surface 13 is cylindrical and has a diameter corresponding to the outer surface of the first tube element 1.

The fitting assembly 1 further comprises a plurality of sealing elements 11 fitted around the male portion 4. These sealing elements 11 help to prevent the fluid from leaking through any gaps existing between the male portion 4 and the first tube element 1.

Advantageously, the sealing elements 11 undergo a radial compression, which is exerted by the tooth elements 9 through the first tube element 1.

In the embodiment shown, the fitting assembly 1 comprises two sealing elements 11, arranged at a distance from each other along the axis A. Moreover, the bushing element 7 is arranged around the first tube element 1 so that each tooth element 9 is positioned at a respective sealing element 11 along the axis A.

The male portion 4 comprises a tubular element with axis A and having a radially external surface 4a and a radially inner surface 4b.

In the embodiment shown, the radially external surface 4a has a variable diameter. In particular, proceeding along the axis A from the point where the male portion 4 is closest to the female portion 5, it is possible to identify:

a cylindrical or substantially cylindrical section 20;
a shoulder 21, which defines the maximum diameter of the male portion 4a;
an intermediate section 22 of progressively decreasing diameter;
a groove 23 for housing a sealing element 11;
a section 24 with a saw-tooth profile in the longitudinal sectional plane passing through the axis A;
a groove 25 for housing another sealing element 11; and
an end section 26 of progressively decreasing diameter, to facilitate the coupling of the male portion 4 with the first tube element 1.

Figures 2, 3A, 3B:
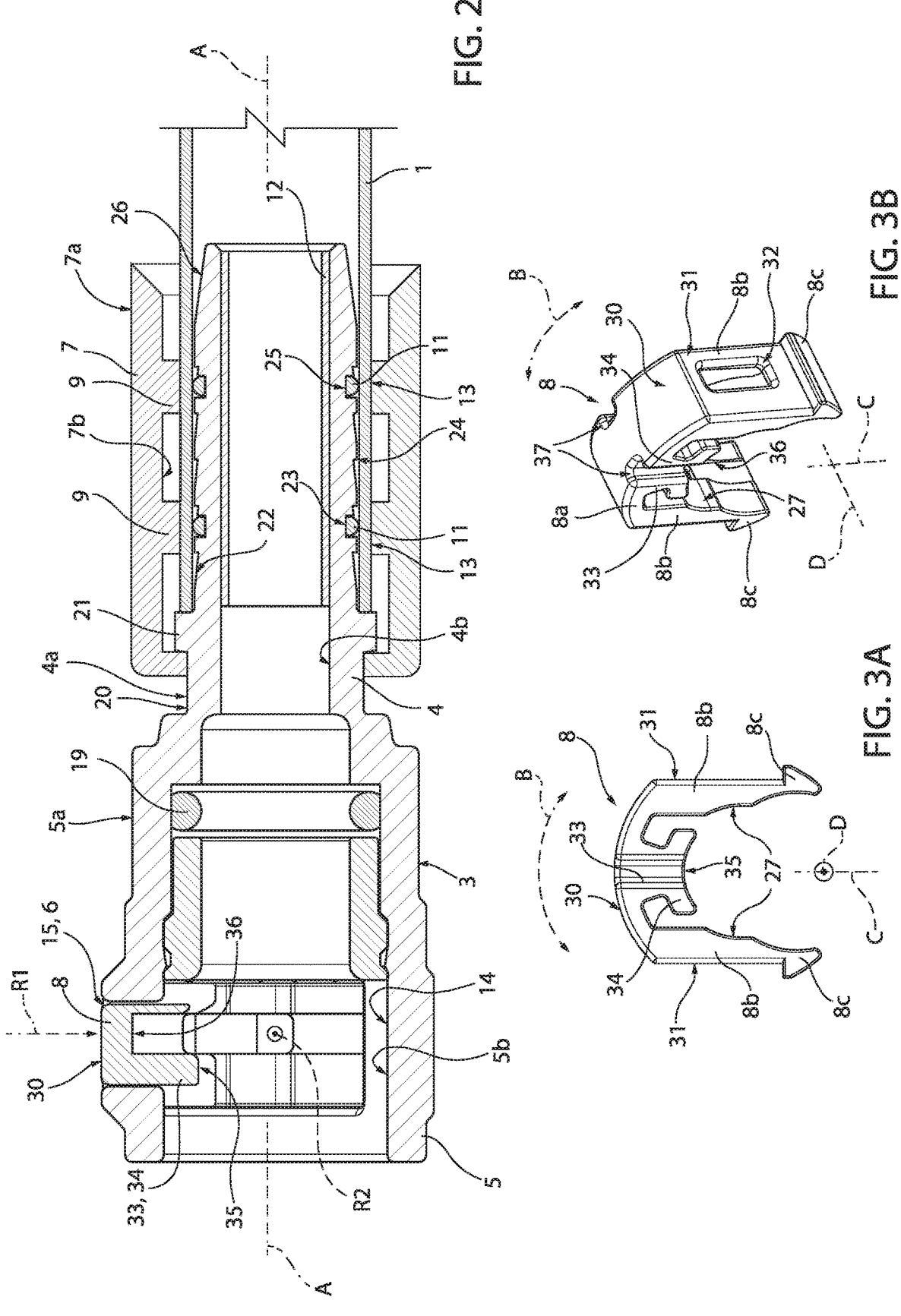
FIG. 2 shows a cross-section of the fitting assembly in FIG. 1 along a longitudinal plane thereof.
FIG. 3A shows a front view of a component of the fitting assembly in FIGS. 1 and 2.
FIG. 3B shows a perspective view of the component in FIG. 3A.

In particular, the first tube element 1 is fitted around the male portion 4, so that it abuts against the shoulder 21 parallel to the axis A (FIGS. 2, 4 and 5).

Furthermore, one of the two sealing elements 11 is housed in the groove 23, and the other is housed in the groove 25. However, the fitting assembly 1 could comprise more than two sealing elements 11 housed in as many grooves 23, 25 of the radially external surface 4a.

In particular, as shown in FIGS. 2, 4 and 5, the sealing elements 11 housed inside the respective grooves 23, 25 protrude radially with respect to the radially external surface 4a. In this way, the sealing elements 11 housed inside the respective grooves 23, 25 are in contact with the radially inner surface of the first tube element 1.

Preferably, the radially inner surface 4b has a constant diameter substantially equal to the inner diameter of the second tube element 2 (FIGS. 4 and 5).

The fitting assembly 1 further comprises a reinforcing bushing 12 arranged radially inside the male portion 4. The reinforcing bushing 12 can be made, for example, of metallic material and has the purpose of stiffening the male portion 4.

In the illustrated embodiment, the reinforcing bushing 12 extends along the male portion 4 in the axial section comprised between its free axial end and the intermediate section 22.

As shown in FIGS. 1, 4 and 5, the female portion 5 comprises a radially external surface 5a and a radially inner surface 5b. In particular, the radially inner surface 5b defines a cavity 14 inside which the second tube element 2 is inserted.

A first opening 15 is formed in the radially external surface 5a for inserting and removing the locking element 8. The first opening 15 extends along part of the circumferential length of the female portion 5 and throughout the thickness of the female portion 5 in the radial direction with respect to the axis A.

A second opening 16 and a third opening 17 are also formed in the radially external surface 5a. These second and third openings 16, 17 extend radially throughout the thickness of the female portion 5 and have a shorter circumferential length than the circumferential length of the first opening 15. The second and third openings 16, 17 also extend along the same axial section of the female portion 5 (FIG. 1).

The second and third openings 16, 17 are formed on opposite sides of the first opening 15 in the circumferential direction. Furthermore, the second and third openings 16, 17 are preferably formed in the female portion 5 so that they are equidistant from the first opening 15 in the circumferential direction and identical to each other.

The first opening 15, the second opening 16, the third opening 17, and part of the cavity 14 define the seat 6 for inserting the locking element 8.

As shown in FIG. 1, the female portion 5 comprises two protrusions 18 at the first opening 15. These protrusions 18 face each other and protrude from the radially external surface 5a radially outwards and axially towards the first opening 15.

The protrusions 18 act as reference elements for the insertion of the locking element 8 in the seat 6. The protrusions 18 extend radially as far as the radially inner surface 5b. Therefore, at the same time, the protrusions 18 act as guides for the insertion of the locking element 8.

Figure 6:
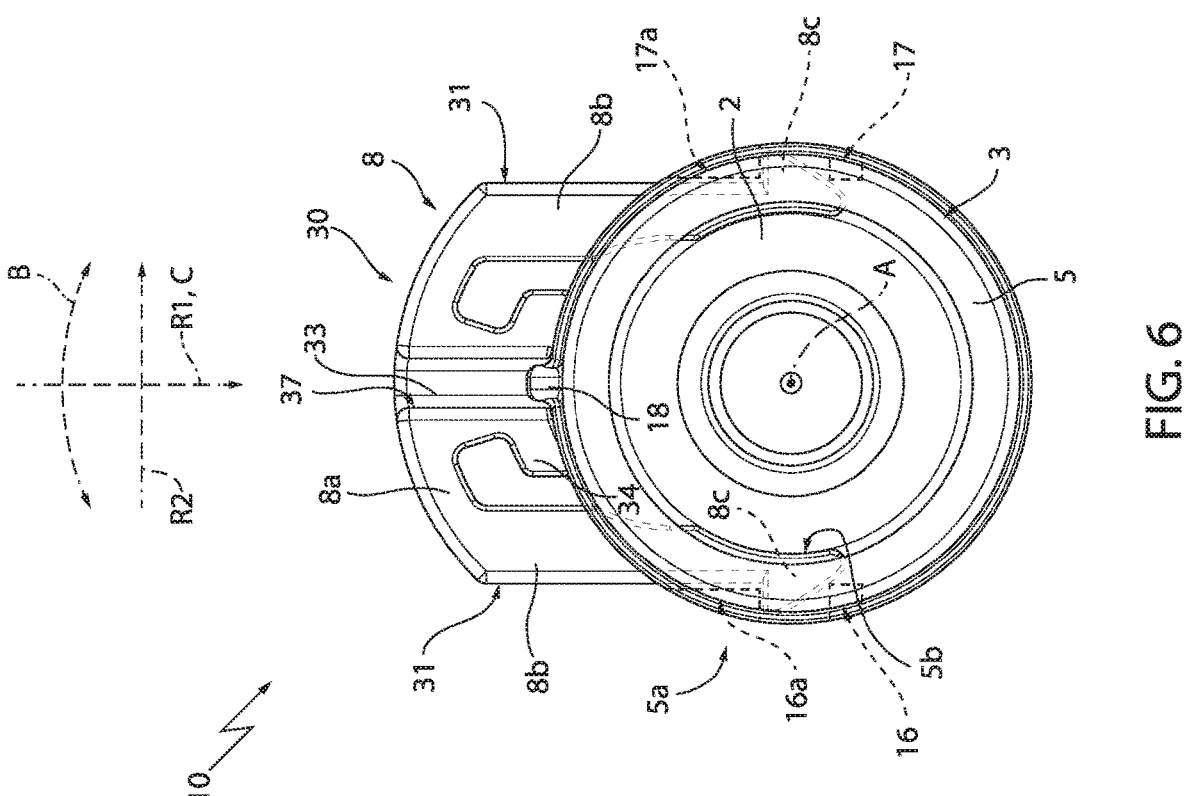

Preferably, a fourth opening 16a and a fifth opening 17a are also formed in the radially external surface 5a (FIGS. 1 and 6).

Similar to the second and third openings 16, 17, the fourth and fifth openings 16a, 17a extend radially throughout the thickness of the female portion 5 and have a shorter circumferential length than the circumferential length of the first opening 15. The fourth and fifth openings 16*a*, 17*a* also extend along the same axial section of the female portion 5 as the second and third openings 16, 17.

The fourth and fifth openings 16*a*, 17*a* are formed on opposite sides of the first opening 15 in the circumferential direction. Furthermore, the fourth and fifth openings 16*a*, 17*a* are preferably formed in the female portion 5 so that they are equidistant from the first opening 15 and from the second and third openings 16, 17, respectively, in the circumferential direction and identical to each other.

As shown in FIG. 6, the fourth opening 16*a* is interposed circumferentially between the first opening 15 and the second opening 16; the fifth opening 17*a* is interposed circumferentially between the first opening 15 and the third opening 17.

The fitting assembly 10 comprises a further sealing element 19 housed inside the cavity 14, to prevent the leakage of the pressurized fluid flowing from the male portion 4 towards the second tube element 2.

Figure 7:
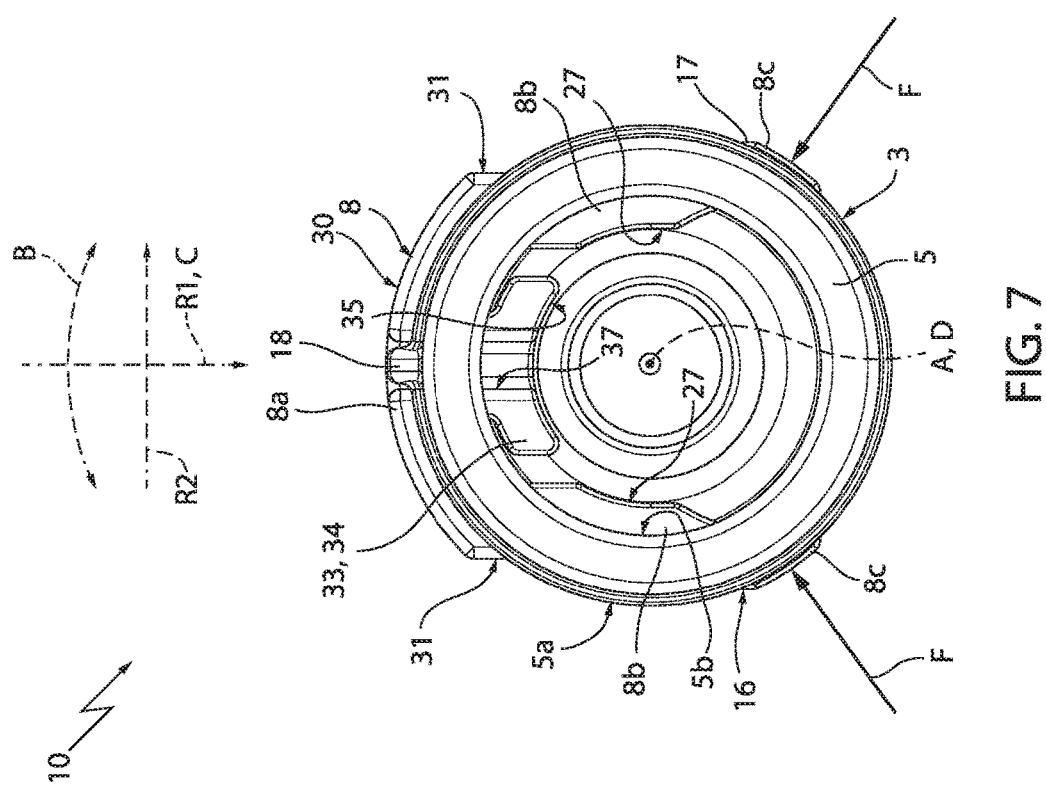
FIGS. 6 and 7 show respective side views of the fitting assembly in the operating positions of FIGS. 4 and 5.

As shown in FIGS. 6 and 7, the locking element 8 can be engaged inside the seat 6 along a radial direction R1 with respect to the longitudinal axis A. In particular, this direction R1 is vertical according to the orientation of the fitting assembly 10 shown in FIGS. 6 and 7.

As described in greater detail below, when the locking element 8 is engaged inside the seat 6 it is in radial contact with the second tube element 2 (FIG. 7). Moreover, in this condition, a flange element 2*a* of the second tube element 2 is engaged by the locking element 8 (FIG. 5).

The locking element 8 can also be disengaged from the seat 6 by a force F having a non-zero component along a direction R2, which is radial with respect to the longitudinal axis A and orthogonal to the radial direction R1. In other words, as can be seen in FIG. 7, the force F necessary to remove the locking element 8 from the seat 6 has a non-zero horizontal component.

Preferably, the locking element 8 can be at least partially disengaged from the seat 6 without being completely removed from the female portion 5. In this case, the locking element 8 can be used in the same way as a key which can be moved between two operating positions while remaining engaged in the female portion 5.

As shown in FIGS. 3A and 3B, the locking element 8 comprises a main portion 8*a* and two lateral portions 8*b*.

In detail, the main portion 8*a* comprises a cylindrical surface 30, which defines a circumferential direction B.

The lateral portions 8*b* extend from the main portion 8*a* at the respective ends of the main portion 8*a* along the circumferential direction B. In other words, the main portion 8*a* and the two lateral portions 8*b* define a U-shape.

The two lateral portions 8*b* each comprise a flat surface 31. Said flat surfaces 31 are parallel to each other and perpendicular to a plane tangent to the cylindrical surface 30 at its midpoint.

The flat surfaces 31 define a longitudinal extension direction C. This direction C coincides with the radial direction R1 when the locking element 8 is engaged in the seat 6 (FIGS. 6 and 7).

Each lateral portion 8*b* also has a cylindrical surface 27 adapted to be placed in radial contact with the second tube element 2 when the locking element 8 is engaged in the seat 6 (FIG. 7). Each cylindrical surface 27 is opposite to the respective flat surface 31 of the same lateral portion 8*b*.

The locking element 8 also comprises an engaging element 8*c* at each lateral portion 8*b* (FIGS. 3A and 3B). Each of said engaging elements 8*c* protrudes outwards from the respective flat surface 31.

As shown in FIG. 7, each of the engaging elements 8*c* is shaped to engage one of the second and the third opening 16, 17, respectively, of the female portion 5. Preferably, the engaging elements 8*c* snap-fit the respective second or third opening 16, 17. Furthermore, when the locking element 8 is engaged in the seat 6, the engaging elements 8*c* protrude, with respect to the radially external surface 5*a*, from the second and the third opening 16, 17, thus preventing the locking element 8 to be radially removed from the seat 6.

In order to disengage the locking element 8 from the seat 6, it is necessary to apply the force F to the engaging elements 8*c*, so as to release them from the second and the third opening 16, 17 (FIG. 7).

As shown in FIG. 6, each of the engaging elements 8*c* is also shaped to engage one of the fourth and the fifth opening 16*a*, 17*a*, respectively, of the female portion 5. Preferably, the engaging elements 8*c* snap-fit the respective fourth or fifth opening 16*a*, 17*a*.

In detail, the engaging elements 8*c* engage the respective fourth or fifth opening 16*a*, 17*a* when the locking element 8 is disengaged from the seat 6 but remains partially engaged in the female portion 5. In further detail, when the locking element 8 is disengaged from the seat 6, the engaging elements 8*c* protrude, with respect to the radially external surface 5*a*, through the fourth and the fifth opening 16*a*, 17*a*, thus preventing the locking element 8 to be completely removed from the female portion 5.

The locking element 8 also has two openings 32, each in a respective lateral portion 8*b*. In detail, the openings 32 are each formed in a respective flat surface 31, are through openings, and have a substantially rectangular shape.

The two openings 32 can be used, for example, to facilitate the removal of the locking element 8 from the seat 6.

The locking element 8 also comprises a lug 33, which extends from the main portion 8*a* along the direction C to the side opposite the circumferential surface 30.

Said lug 33, in turn, comprises a portion 34, which defines a cylindrical surface 35 on the side opposite the cylindrical surface 30.

As shown in FIG. 7, the cylindrical surface 35 is adapted to be placed in radial contact with the second tube element 2 when the locking element 8 is engaged in the seat 6.

The locking element 8 also defines two seats 36 adapted to be engaged by the second tube element 2 when the locking element 8 is engaged in the seat 6. As shown in FIG. 3B, the seats 36 are each formed in a respective lateral portion 8*b* on the side opposite the respective flat surfaces 31. In particular, each of said seats 35 extends up to a respective radial opening 32 formed in the lateral portion 8*b* of the locking element 8.

As shown in FIG. 5, the seats 36 are engaged by the flange element 2*a* of the second tube element 2 and are adapted to limit the movements of the second tube element 2 in the direction parallel to the axis A.

In particular, the flange element 2*a* engages the seats 36 with a clearance parallel to the axis A.

The main portion 8*a* is also formed with two grooves 37 adapted to be engaged by the protrusions 18 of the female portion 5 (FIGS. 6 and 7). In particular, the grooves 37 are formed at the midpoint of the main portion 8*a* along the circumferential direction B. The grooves 37 also extend throughout the length of the lug 33 along the direction C and are formed at respective opposite ends of the cylindrical surface 30 along an axial direction D thereof.

The fitting assembly 10 is assembled according to the following.

In use, the sealing elements 11 are housed inside the respective grooves 23, 25 of the male portion 4. Subsequently, the male portion 4 is engaged inside the first tube element 1, so that the first tube element 1 is placed in abutment against the shoulder 21 parallel to the axis A. In this condition, the sealing elements 11 are radially interposed between the radially external surface 4a and the first tube element 1.

The bushing element 7 is then fitted around the first tube element 1. In this way, the bushing element 7 is arranged radially external to the first tube element 1 and to at least part of the male portion 4.

In this condition, the tooth elements 9 are placed in radial contact with the radially external surface of the first tube element 1. In particular, the surface 13 of each tooth element 9 is placed in radial contact with the first tube element 1.

Preferably, the bushing element 7 is mounted around the first tube element 1 so that each tooth element 9 is axially arranged at a respective sealing element 11.

The bushing element 7 is then subjected to a crimping operation by means of a crimp tool acting on the radially external surface 7a. At the end of this crimping operation, the tooth elements 9 exert a radial compression action on the first tube element 1 and on the sealing elements 11.

In particular, the tooth elements 9 could exert a radial compression action even before the crimping operation, but to a lesser extent than the radial compression action they exert after the crimping operation.

At this point, the second tube element 2 is inserted inside the cavity 14 from the axial end of the female portion 5 opposite the male portion 4.

If the locking element 8 is completely disengaged from the female portion 5, the locking element 8 is then inserted through the first opening 15 along the radial direction R1 starting from the lateral portions 8b (FIG. 6). The lowering of the locking element 8 inside the seat 6 can take place, for example, by pressing on the cylindrical surface 30.

During the operations by which the locking element 8 is engaged into the seat 6, the grooves 37 cooperate with the protrusions 18.

The locking element 8 is pressed along the radial direction R1 until the engaging elements 8c snap-fit the second and the third opening 16, 17, respectively. In this condition, the cylindrical surfaces 27 and 35 are in radial contact with the external cylindrical surface of the second tube element 2 and the flange element 2a engages the seats 36 of the locking element 8.

In this way, all relative movements between the second tube element 2 and the female portion 5 are blocked or in any case limited.

If the locking element 8 is already partially engaged in the female portion 5, it is sufficient to move the locking element 8 from its position along the radial direction R1 until the engaging elements 8c engage the second and the third opening 16, 17, respectively. In detail, the locking element 8 partially engaged in the female portion 5 has the engaging elements 8c engaged in the fourth and the fifth opening 16a, 17a, respectively. Therefore, in order to move the locking element 8 from this position it is necessary to push the locking element 8 along the radial direction R1, so that the engaging elements 8c disengage from the respective fourth and fifth openings 16a, 17a.

If it should be necessary to remove the second tube element 2 from the female portion 5, it is necessary to disengage the locking element 8, at least partially, from the seat 6. To this end, it is necessary to apply the force F to the engaging elements 8c, so as to disengage them from the second and the third opening 16 and 17. This force F must have a non-zero component along the radial direction R2.

Once the engaging elements 8c are disengaged, the locking element 8 can be moved along the direction R1, so as to eliminate the radial contact between the cylindrical surfaces 27 and 35 and the external cylindrical surface of the second tube element 2, so as to disengage the flange element 2a from the seats 36.

The locking element 8 can therefore be completely removed from the female portion 5. Alternatively, if the locking element 8 is disengaged from the seat 6 without being completely removed from the female portion 5, the locking element 8 must be moved along the direction R1 until the locking elements 8c engage the fourth and the fifth opening 16a, 17a, respectively (FIGS. 4 and 6). It is noted that the insertion of the second tube element 2 and its locking by means of the locking element 8 can also occur simultaneously or before the insertion of the male portion 4 in the first tube element 1 and the crimping operation.

The advantages of the fitting assembly 1 and of the hydraulic assembly according to the invention are clear from the foregoing.

In particular, since the fitting assembly 1 at the same time comprises the locking element 8, which makes it possible to limit the relative movements between the second tube element 2 and the fitting element 3 and the bushing element 7, which exerts a radial compression on the first tube element 1, the transfer of pressurized fluids can be guaranteed in a simple and fast way, while minimizing the risk of fluid leaks.

Moreover, since the tooth elements 9 exert a radial compression action on the sealing elements 11, the efficiency of these sealing elements 11 in preventing fluid leakage is considerably increased. In fact, this radial compression action minimizes the risk that the fluid will leak through any gaps present between the male portion 4 and the first tube element 1.

In detail, the particular shape of the locking element allows cooperation in close contact with the second tube element 2.

The presence of through openings 32 communicating with the seats 36 also makes it easier to remove the locking element 8 when replacing it.

Lastly, it is clear that modifications and variations may be made to the fitting assembly 1 manufactured according to the present invention, without however departing from the scope of protection defined by the claims.

The invention claimed is:

1. A fitting assembly for fitting a first tube element to a second tube element, the fitting assembly comprising:

a fitting element defining a longitudinal axis and comprising a male portion adapted to engage said first tube element and a female portion adapted to be engaged by said second tube element; said female portion being opposite to said male portion along said longitudinal axis and further defining a seat;

a bushing element adapted to be arranged radially external with respect to said male portion and said first tube element and to exert, in use, a radial compression on said first tube element; and a locking element adapted to limit the relative movements of said second tube element with respect to said fitting element when, in use, it engages said seat, wherein, before crimping, the bushing element comprises at least one tooth element at a radially inner surface before crimping, the at least one tooth element being adapted to exert, in use, a radial compression on the first tube element;

wherein said bushing element is a crimp bushing comprising a radially external surface adapted to be engaged by a crimp tool and the radially inner surface adapted to face said first tube element;

wherein said locking element defines a pair of seats adapted to house said flange element of said second tube element, the locking element comprising a main portion and a pair of lateral portions;

wherein said main portion comprises a lug defining a surface adapted to cooperate in contact with an outer surface of said second tube element when the locking element is engaged in the seat; and wherein the pair of lateral portions each defines at least one seat, each lateral portion defining an opening communicating with said at least one seat.

2. The fitting assembly according to claim 1 further comprising at least one sealing element fitted around said male portion;

said at least one tooth element being adapted to exert, in use, a radial compression on said sealing element.

3. The fitting assembly according to claim 2, wherein said bushing element is adapted to be arranged in such a manner that each tooth element is arranged in the same position as a respective sealing element fitted around said male portion along said longitudinal axis.

4. The fitting assembly according to claim 1, wherein said locking element is engageable, in use, with said seat along a first radial direction of said fitting assembly;

said locking element being at least partially disengageable, in use, from said seat by means of a force having a non-zero component along a second radial direction transversal to said first radial direction.

5. The fitting assembly according to claim 1, wherein said female portion comprises a first opening, a second opening and a third opening for the insertion and removal of said locking element;

said locking element comprising two engaging elements adapted to snap-fit one of said second opening and said third opening, respectively.

6. The fitting assembly according to claim 5, wherein said female portion comprises a fourth opening and a fifth opening;

said engaging elements being adapted to snap-fit one of said fourth opening and said fifth opening, respectively, when, in use, said locking element is at least partially disengaged from said seat.

7. The fitting assembly according to claim 6, wherein the second opening, the third opening, the fourth opening, and the fifth opening extend radially completely through a thickness of the female portion.

8. The fitting assembly according to claim 1, further comprising a reinforcing bushing arranged radially inside said male portion.

9. A hydraulic assembly comprising:
a first tube element;
a second tube element;
the fitting assembly according to claim 1 for fitting said first tube element to said second tube element.

10. The fitting assembly according to claim 1, wherein:
each of the pair of lateral portions completely defines a periphery of the opening; and
excluding the opening, the at least one seat only extends partially through the each of the pair of lateral portions.

* * * * *